Feb. 26, 1935.  E. W. SCHNEPP ET AL  1,992,243
CREAM SEPARATOR
Filed Nov. 14, 1932
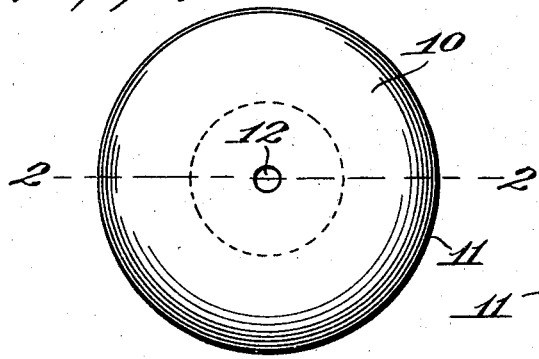
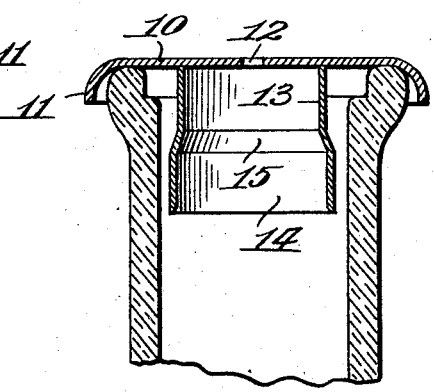
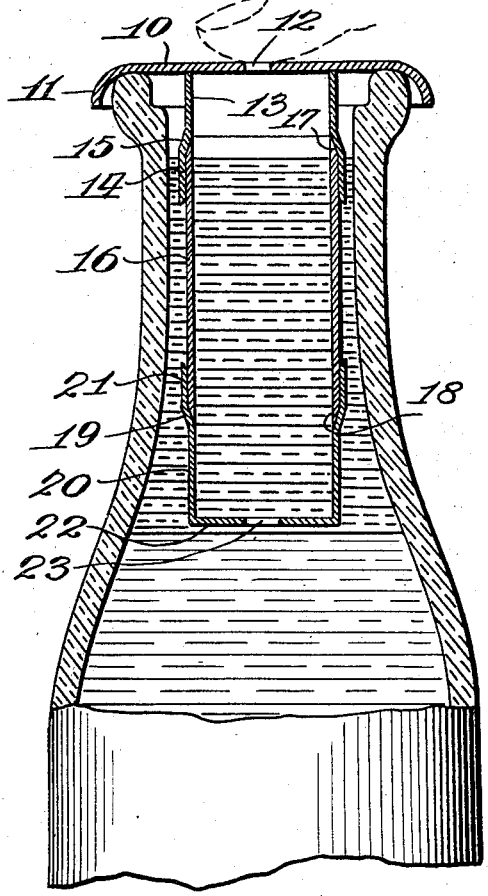
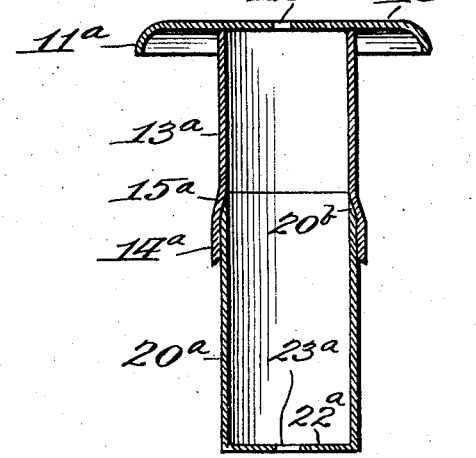
INVENTORS:—
EMIL W. SCHNEPP AND
LOUIS W. SCHNEPP.
BY Martin P. Smith, ATTY.

Patented Feb. 26, 1935

1,992,243

UNITED STATES PATENT OFFICE 1,992,243

CREAM SEPARATOR

Emil W. Schnepp, Colton, and Louis W. Schnepp, San Bernardino, Calif.

Application November 14, 1932, Serial No. 642,576

2 Claims. (Cl. 210—51.5)

Our invention relates to a cream separator that is especially designed for use in connection with milk bottles for removing the body of cream that accumulates on top of the body of milk contained within the bottle and the principal objects of our invention are, to generally improve upon and simplify the construction of the existing forms of similar devices, to provide a cream separator and remover that is relatively simple in construction, inexpensive of manufacture and which is constructed so that it may be easily and quickly taken apart and cleansed so as to be maintained in sanitary condition.

A further object of our invention is, to provide a cream separator and remover that may be conveniently manipulated with one hand and a part of the device being constructed so that when detached from the other parts it may be conveniently used as a cap for closing the mouth of a milk bottle while the same is stored in a refrigerator or cooling closet.

With the foregoing and other objects in view our invention consists in certain novel features of construction and arrangements of parts that will be hereinafter more fully described and claimed and illustrated in the accompanying drawing in which:

Fig. 1 is a top plan view of a cream separator and remover constructed in accordance with our invention.

Fig. 2 is a vertical cross section taken on the line 2—2 and showing the device positioned for use in the neck and upper portion of the milk bottle.

Fig. 3 is a vertical section similar to Fig. 2 and showing the upper part of the device detached from the lower part and positioned for use as a cap or closure for the mouth of the bottle.

Fig. 4 is a vertical section taken lengthwise through the center of a modified form of the device.

Referring by numerals to the accompanying drawing and particularly to the construction illustrated in Figs. 1 to 3 inclusive and which illustrate a preferred embodiment of our invention, 10 designates a disc of metal of sufficient size to cover and entirely close the mouth of the milk bottle and the marginal portion of this disc is bent downwardly to form a curved lip or flange 11, which when the device is applied for use, fits over and around the lip that surrounds the mouth of the bottle.

Formed in the center of disc 10, is a small aperture 12.

Rigidly fixed to the underface of disc 10, and concentric therewith, is a short tubular member 13, the lower portion 14 of which is slightly larger in diameter than the upper portion and the intermediate portion of the wall of said member 13 between the upper and lower portions of different diameters, is tapered as designated by 15.

The upper portion of a tubular body member 16, having the same diameter as the upper portion of tubular member 13, is adapted to slide into and out of the lower portion 14 of tubular member 13 and the upper end of the outer face of said tubular member 16 is beveled as designated by 17 in order to be received and fit snugly against the inner face of the tapered intermediate portion 15 of member 13.

The lower portion of the outer face of tubular body member 16 is tapered or beveled as designated by 18 in order to be received and fit snugly within a correspondingly tapered intermediate portion 19 of a cap 20. The lower portion of the circular wall of this cap has the same diameter as the tubular body member 16 and the upper portion 21 of said cap is slightly increased in diameter so as to have a sliding fit with the lower end portion of tubular member 16.

The lower end of cap 20 is closed by a plate 22 in the center of which is formed an aperture 23.

When the device constructed as just described is assembled for use, the upper portion of tubular body member 16 is inserted in the lower portion 14 of tubular member 13, and the lower end of said tubular body member 16 receives the upper portion 21 of cap 20.

The hollow cylindrical body comprising the parts 20, 16 and 13, is now slowly inserted through the mouth of a milk bottle with aperture 12 open and the body of cream on top of the body of milk will flow through aperture 20, thereby filling or partially filling the chamber within the cylindrical body and when the disc 10 rests upon the lip of the bottle, a finger is pressed on top of the center of said disc so as to close aperture 12, thereby cutting off the admission of air to the upper end of the chamber within the hollow body of the device and said device is now lifted from the bottle, with the filling of cream that entered the chamber within the hollow body through the opening 23. The lower end of the device is now placed over a suitable container and upon removal of the finger from the aperture 12, the removed cream will discharge into the receptacle through opening 23.

All parts of the cream removing device may be easily and quickly cleansed and sterilized after the three parts of said device have been detached from one another.

To prevent rusting and corrosion, all parts of the device may be plated or coated with tin or other metal or suitable enamel.

In order to provide a cap or closure for the milk bottle after the cream has been removed, the upper member of the device and which comprises the disc 10 and tubular member 13, may be detached from the upper end of tubular body member 16 and placed over the mouth of the bottle and within the upper portion of the mouth thereof, as illustrated in Fig. 3.

The modified form of device illustrated in Fig. 4 is composed of but two parts. The upper part comprises a disc 10ª, having a downwardly curved marginal flange 11ª and a centrally arranged aperture 12ª.

Secured to and depending from the central portion of the disc is a tubular member 13ª, having its lower portion 14ª slightly increased in diameter and that portion of the wall that connects the upper and lower portions of different diameters being tapered as designated by 15ª.

The lower member comprises a cup 20ª, the upper portion of which is adapted to slide into and out of the lower portion 14ª of the upper member and the outer face of the upper portion of the wall of said lower member is tapered or beveled as designated by 20ᵇ, so as to be received and fit snugly against the inner face of the tapered portion 15ª.

The lower end of cup 20ª is closed by a plate 22ª, in the center of which is formed a cream inlet opening 23ª.

Thus it will be seen that we have provided a cream separator and remover that is relatively simple in construction, inexpensive of manufacture and which has the desirable feature of being readily taken apart in order that all parts of the device may be readily closed and sterilized and thereby maintained in a sanitary condition.

It will be understood that minor changes in the size, form, and construction of the various parts of our improved cream separator may be made and substituted for those herein shown and described without departing from the spirit of the invention, the scope of which is set forth in the appended claims.

We claim as our invention:

1. A cream remover comprising a disc having its marginal portion bent downward to form a curved flange that is adapted to encircle and enclose the lip on the mouth of a standard milk bottle, there being an opening formed in the center of said disc, a tube secured to and depending from the underside of said disc, the lower portion of which tube is slightly increased in diameter, there being an internally arranged inclined shoulder formed between the portions of said tube of different diameters, a cup having its upper end removably seated in the lower enlarged portion of said tube, the upper edge of the wall of which cup is beveled inwardly so as to fit snugly against the inclined shoulder within said tube and form a smooth joint between the inner faces of the walls of said tube and cup, and there being an opening formed in the bottom of said cup.

2. A cream remover comprising a disc having its marginal portion bent downward to form a curved flange that is adapted to encircle and enclose the lip on the mouth of a standard milk bottle, there being an opening formed in the center of said disc, a short tubular collar secured to and depending from the underside of said disc, the lower portion of which collar is slightly increased in diameter, the shoulder between the portions of said collar of different diameters being inclined a tube having its upper end removably seated in the enlarged lower portion of said collar, the upper edge of the wall of said tube being beveled inwardly so as to fit snugly against the inclined shoulder between the upper portion of said collar an dthe enlarged lower portion thereof and provide a smooth joint between the inner faces of the walls of said collar and tube, a cup removably seated on the lower end of said tube, the upper portion of which cup is slightly enlarged in diameter to receive the lower end of said tube, the lower end of the wall of said tube being beveled inwardly so as to fit snugly against the shoulder between the lower portion of the cup, and the enlarged upper portion thereof and form a smooth joint between the inner faces of the walls of said tube and cup, and there being an opening formed in the center of the bottom of said cup.

EMIL W. SCHNEPP.
LOUIS W. SCHNEPP.